Figure 1:
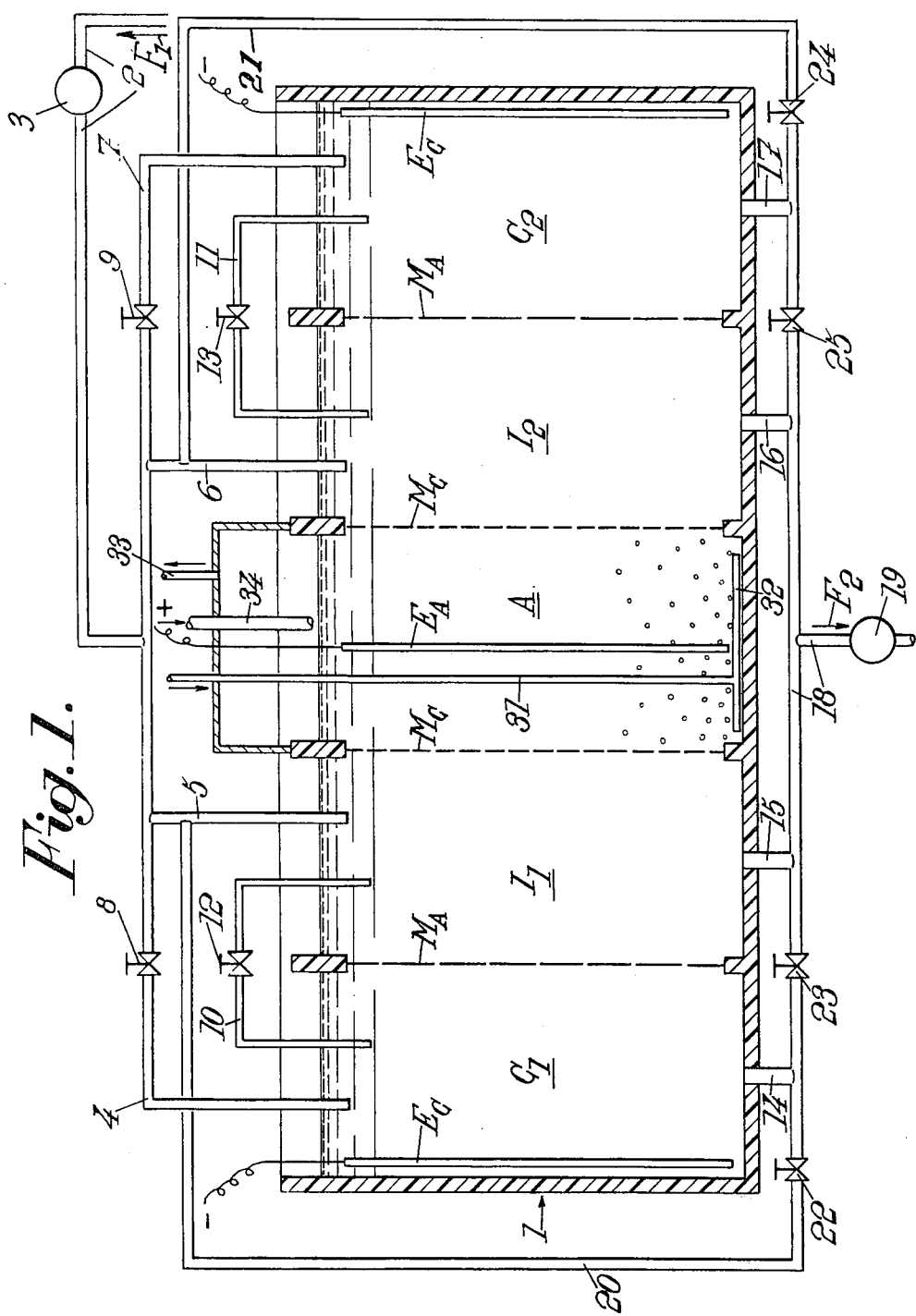

United States Patent [19]

Bonnemay nee Couture et al.

[11] 4,058,441

[45] Nov. 15, 1977

[54] PROCESS FOR THE REGENERATION OF SPENT PICKLING SOLUTIONS

[75] Inventors: Andrée Bonnemay nee Couture, Boulogne; Jean Royon, La Varenne; Jean Bereau, Chatenay Malabry; Jean-Claude Catonne, Ivry, all of France

[73] Assignee: Societe d'Etude pour la Regeneration de l'Acide Chlorhydrique SEPRAC, France

[21] Appl. No.: 581,674

[22] Filed: May 28, 1975

[30] Foreign Application Priority Data

May 28, 1974 France ................ 74.18478

[51] Int. Cl.² .............. C25B 1/22; C25C 1/06
[52] U.S. Cl. .................... 204/103; 204/113
[58] Field of Search ................ 204/113, 103

[56] References Cited

U.S. PATENT DOCUMENTS

| | | | |
|---|---|---|---|
| 2,810,686 | 10/1957 | Bodamer et al. | 204/263 |
| 2,865,823 | 12/1958 | Harris et al. | 204/112 |
| 2,967,806 | 1/1961 | Osborne et al. | 204/263 |
| 3,072,545 | 1/1963 | Juda et al. | 204/113 |

*Primary Examiner*—R. L. Andrews
*Attorney, Agent, or Firm*—Brumbaugh, Graves, Donohue & Raymond

[57] ABSTRACT

Regeneration of spent hydrochloric acid after use for pickling iron, which therefore contains iron chlorides, by electrolysis in the cathodic and intermediate compartments of an electrodialysis cell. The installation includes electric circuitry for connecting up the anode as well as input conduits for the spent acid but otherwise consists essentially of an electrodialysis cell with an uneven number of compartments wherein each cathodic compartment is separated from the adjacent intermediate compartment by an anion-selective membrane while a cation-selective membrane separates each intermediate compartment from the anodic compartment, the latter being filled with an anolyte whose total Faraday yield for water oxidation is close to 1. Electrolysis is conducted with current densities at the cathode of 0.1 - 20 A/dm², at the anode corresponding to the water oxidation reaction and at the membranes such that their perm-selectivity is close to 1. The ionic strengths in equivalents of the regenerated solution and of the untreated spent acid are the same.

5 Claims, 2 Drawing Figures

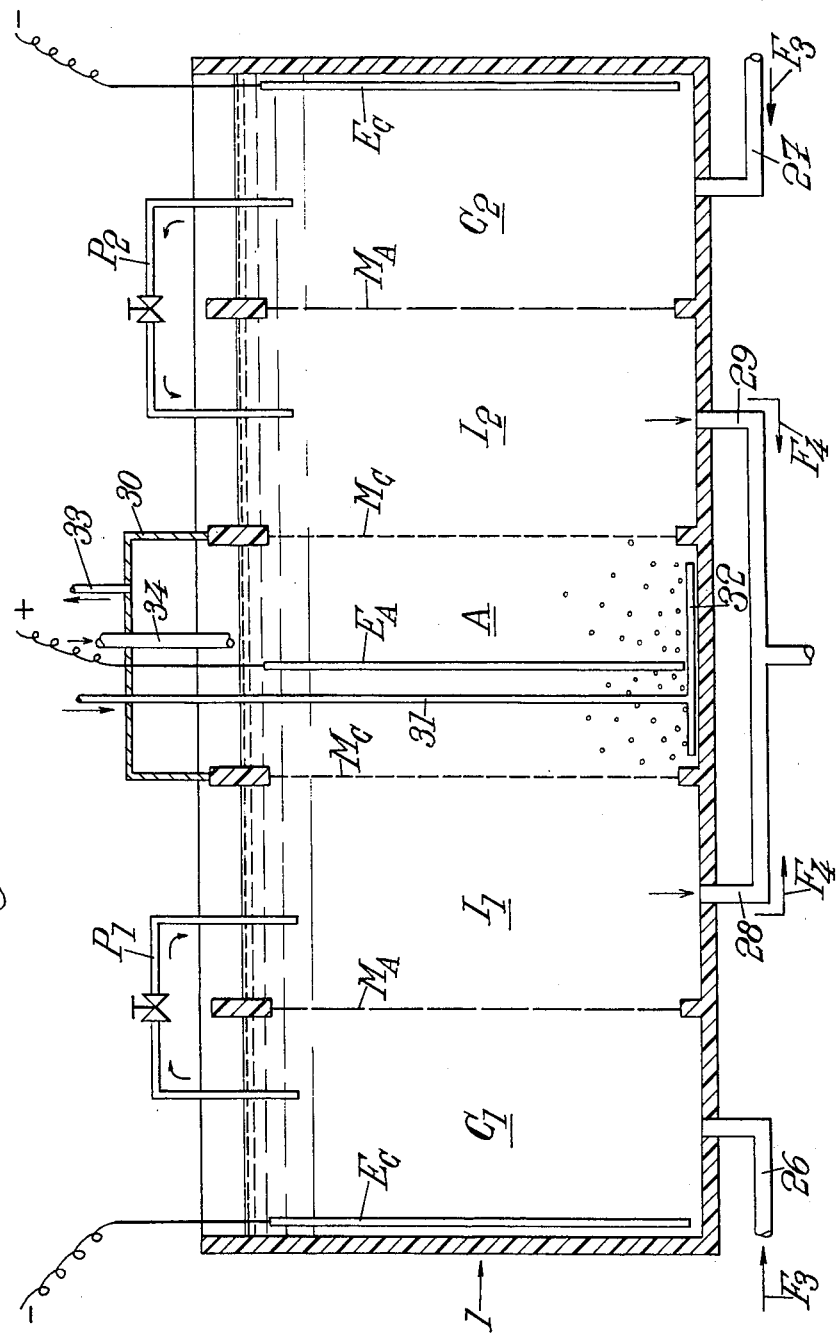

PROCESS FOR THE REGENERATION OF SPENT PICKLING SOLUTIONS

This invention relates to improvements in processes and installations for the regeneration of spent pickling solutions. It is more specifically concerned with the regeneration of pickling solutions based upon hydrochloric acid (HCl) and which when spent contain iron chlorides.

Certain industries consume large amounts of hydrochloric acid for pickling iron substrates, especially for instance in connection with galvanizing. Hydrochloric acid is however a difficult material to handle, and there are considerable problems for manufacturers in the disposal of the spent pickling solutions, impoverished in HCl but enriched in iron chlorides, because of the pollutant nature of these solutions.

It is the primary object of this invention to provide a process and an installation by means of which hydrochloric acid-containing pickling solutions when spent can, despite their iron-chloride contents, be readily and effectively regenerated, thus remedying the above-mentioned disadvantages.

According to one aspect of this invention, there is provided a process for the regeneration, after use upon ferriferous surfaces, of spent pickling solutions based upon hydrochloric acid and therefore containing iron chlorides, using an electrodialysis cell having a cathodic compartment separated by an anion-selective membrane from an intermediate compartment which in turn is separated by a cation-selective membrane from an anodic compartment, in which process there is introduced within the anodic compartment of said cell an anolyte with characteristics such that the overall faradic yield for oxidation of water is about 1, whereby substantially all the electric current at the anode is used for the oxidation of water, while first and second portions of the spent pickling solution are subjected respectively and simultaneously in the cathodic compartment and in the intermediate compartment of said cell to an electrolytic treatment so as to deplete the first portion within the cathodic compartment with respect to iron by electrodeposition thereof upon the cathode and so as to enrich the second portion within the intermediate compartment with respect to hydrogen chloride by migration thereinto of chloride ions originating in the cathodic compartment and of hydrogen ions originating from the oxidation of water in the anodic compartment, said electrolytic treatment being conducted in such a manner as to establish and maintain (i) a cathodic current density of from 0.1 to 20 $A/dm^2$, (ii) an anodic current density corresponding to the water-oxidation reaction, and (iii) a current density at the membranes such that their permselectivity is about 1, the arrangement being such that at any time the ionic strength in equivalents of the regenerated solution is equal to the ionic strength in equivalents of the untreated spent pickling solution.

The process is best operated by establishing and maintaining a cathodic current density of from 5 to 12 $A/dm^2$.

In one advantageous way of carrying out the process of the invention, the spent pickling solution is introduced into the cathodic and intermediate compartments in parallel, the proportion directed into the cathodic compartment being dependent upon the treatment capacity thereof.

In a second advantageous way of carrying out the process of the invention, the spent pickling solution is, as in the first way discussed above, introduced into the cathodic and intermediate compartments in parallel, but the solution emergent from the cathodic compartment is recycled through the intermediate compartment.

In a third advantageous way of carrying out the process of the invention, the spent pickling solution is introduced into the cathodic and intermediate compartments in series, the solution under treatment passing successively through the said compartments one after the other.

According to another aspect of this invention there are also provided installations for use in the regeneration of spent pickling solutions, based upon hydrochloric acid and containing iron chlorides following use upon ferriferous surfaces, employing the procedures herein disclosed, which installations comprise an electrodialysis cell having an uneven number of compartments, namely an anodic compartment with an anode mounted therein, at least one cathodic compartment with a cathode mounted therein and for each cathodic compartment an intermediate compartment separated therefrom by an anion-selective membrane and from the anodic compartment by a cation-selective membrane, said cell being provided with electric circuitry for connecting the anode and the cathode(s) to the respective terminals of a source of direct electric current, said installation also including input conduits for introducing spent pickling solution into the cathodic and intermediate compartments so arranged that the spent pickling solution may alternatively at will be introduced thereinto (i) in parallel with regulation of the relative proportions, (ii) in parallel with solution emergent from the cathodic compartment being recycled through the intermediate compartment, and (iii) in series with the solution passing successively through the cathodic and the intermediate compartments.

The installation will preferably be one in which the anodic compartment of the cell is provided with means for protection against the introduction of splashes. It will also advantageously be provided with means for purging the anolyte with gas.

Apart from the matters already mentioned above various preferred features of both the processes and the installations of this invention will become apparent from the detailed description which will now be given, though only by way of illustration, of the process as carried out in the installation shown in the accompanying drawings, in which:

FIG. 1 is a somewhat diagrammatic side-elevation, partly in cross-section, of one embodiment of the installation of this invention; and FIG. 2 is a similar view of another embodiment.

In order to regenerate a spent pickling solution based upon hydrochloric acid as it is discarded from a pickling vat after use in pickling iron or steel sheet or other articles, the following procedure (and indeed variants thereof) may be adopted.

The spent pickling solution is enriched in iron chlorides and impoverished in HCl; and to be regenerated it must be both depleted in its unwanted iron content (which may be achieved by electrolytic deposition on a cathode) and also enriched in HCl. Depletion in iron by electrodeposition thereof is carried out in the cathodic compartment, while HCl enrichment is carried out in the intermediate compartment. These two compartments are separated from one another by an anion-selective membrane, that is to say a membrane impervious to cations but pervious to anions. The cathodic and intermediate compartments from part of an electrodialysis cell the rest of which (in its simplest form) is constituted by an anodic compartment separated from the intermediate compartment by a cation-selective membrane, that is to say a membrane impervious to anions but pervious to cations.

The anodic compartment is filled with an anolyte having characteristics such that the total Faraday yield for the oxidation of water is close 1 whereby substantially 100% of the electric current at the anode is used for the oxidation of water, i.e., to generate $O_2$. Such an anolyte will desirably be an acid solution chosen in respect of its anion to permit an overall Faradaic yield on oxidation of water which is as close to 1 as possible; and the concentration of the anolyte solution will preferably be in the region of the maximum conductivity. For guidance, the anolyte employed can therefore with advantage be 2M sulphuric acid.

After regeneration by the process of this invention, the pickling solution is (as compared with the spent solution) enriched in HCl and impoverished in iron, and is therefore ready to be recycled to the pickling vat.

Both the electrolytic deposition of iron in the cathodic compartment and also the migration of chloride and hydrogen ions into the intermediate compartment (the chloride ions originating from the cathodic compartment as a result of the removal of iron therefrom, and the hydrogen ions originating from the anodic compartment as a result of the oxidation of water therein) are effected by establishing and maintaining:

a cathodic current density of between 0.1 and 20 $A/dm^2$, and preferably between 5 and 12 $A/dm^2$;

an anodic current density corresponding to the oxidation reaction of the water; and a current density at the membranes such that their perm-selectivity, that is to say the transport number of a given ion within the membrane in question, is as close to 1 as possible.

The arrangement is such that, at any moment, the composition in equivalents of chloride ions (that is to say the ratio between the weight of chlorides expressed in grams per liter and the atomic weight of chlorine) of the regenerated solution emerging from the installation is equal to the composition in equivalents of chloride ions of the spent solution to be regenerated before it enters the installation.

In order to achieve the current densities specified above, it is possible to adjust the voltage at the terminals of the direct-current electric power source, and/or the surface area of the electrodes and of the membranes, and/or the temperature of the solutions filling the various compartments (which however should be maintained below 50° C) and/or the hydrodynamic conditions of these solutions.

The basic factor which imposes itself at the outset arises from the membranes. These — and specifically the surface area of any given membrane — determine the maximum current intensity which can be employed. That in turn determines the size of the electrode surfaces needed to secure the specified current densities thereon.

Before dealing with other aspects of the process of the invention, reference will now be made to the accompanying drawings, where FIGS. 1 and 2 respectively show two preferred embodiments of the installation of the invention, which differ from one another in the lay-out of the input conduits for the spent pickling solution.

It will be noted that each embodiment contains an uneven number of compartments, that is to say one anodic compartment and at least one cathodic compartment, containing an anode and cathode(s) connected respectively to appropriate terminals of a direct current source, each cathodic compartment being separated from the anodic compartment by an intermediate compartment. Thus at its simplest the electrodialysis cell used in the installation of this invention has three compartments.

However, in the case of the two preferred embodiments shown in the drawings, the installation in each case includes a cell with five compartments, namely two cathodic compartments $C_1$ and $C_2$, two intermediate compartments $I_1$ and $I_2$ and an anodic compartment A, arranged inside a tank 1, formed of an electrically-insulating material which is substantially undeformable and resistant to the working temperatures to be encountered, for example polyvinyl chloride. The compartments within the tank 1 are formed, as shown, by insertion therein of two anion-selective membranes $M_A$ and two cation-selective membranes $M_C$. As regards the electrodes, the cathodes are marked $E_C$ while the anode is marked $E_A$.

The width (as shown in side-elevation) of both the intermediate compartments and the anodic compartment will preferably be kept as small as possible, so as to limit the ohmic drop in the installation.

The membranes can be of either the homogeneous or the heterogeneous type, framed or unframed; they can if desired be reinforced by a non-conductive support; they must be capable of exchanging the chloride ion Cl as far as the anion-selective membranes $M_A$ are concerned, and of exchanging the hydrogen ion $H^+$ ion as far as the cation-selective membranes $M_C$ are concerned; their permselectivity should be as close to 1 as possible; and their electrical resistance should be as low as possible.

The membranes $M_A$ can be selected from those of the known quaternary ammonium type; and the membranes $M_C$ can be selected from those of the known sulphonic type. For further guidance it may be noted that good results have been secured with membranes which are commercially available from Ionic Inc., under the trade-name NEPTON.

The electrodes should be chosen to attain the following characteristics:

as far as concerns the anode, its Faradaic oxidation yield should correspond to the oxidation of water with a yield close to 1; and as far as concerns the cathode, it should display the least possible over-voltage for hydrogen and for iron.

For guidance, we have found that the anode may satisfactorily be made of platinized titanium, while the cathode may be made of expanded iron.

As already mentioned, the embodiments of respectively FIG. 1 and FIG. 2 differ from each other as regards the arrangements for input of the spent pickling solution.

In the embodiment of FIG. 1, the input to the cathodic and intermediate compartments is effected in parallel. Spent pickling solution from the pickling vat (not shown) enters the installation via a pipe-line 2, in the direction of arrow $F_1$, for example driven by a pump 3; obviously however the pickling solution could equally be driven merely by gravity if the installation is suitably positioned relative to the pickling vat. The pipe-line 2 is connected to respectively the compartments $C_1$, $I_1$, $C_2$ and $I_2$ by branch pipelines 4, 5, 6 and 7.

In order to regulate the proportion of spent pickling solution introduced into the cathodic compartments so as to adjust the amount thereof to their treatment capacity, adjustable valves 8 and 9 are interposed in the pipelines 4 and 7.

A possible modification is shown in FIG. 1, where bridging pipes 10 and 11, provided respectively with adjustable valves 12 and 13, are used to interconnect compartments $C_1$ and $I_1$ on the one hand, and $C_2$ and $I_2$ on the other hand. These bridging pipes 10 and 11 play the role of pipe-lines 4 and 7 when the latter are not there, or when the valves 8 and 9 are closed.

The compartments $C_1$, $I_1$, $C_2$ and $I_2$ are connected via pipe-lines 14, 15, 16 and 17 to a return pipe-line 18, which collects the regenerated pickling solution and returns it, in the direction of the arrow $F_2$, towards the pickling vat (not shown). A pump 19 is provided to drive the regenerated solution back to the vat. As with the other pump 3, it would be possible if the installation was suitably located relative to the pickling vat to dispense with the pump 19.

As can be seen from FIG. 1, the pipe-lines 14 and 17 can be connected to the compartments $I_1$ and $I_2$ via pipe-lines 20 and 21, thus making it possible for solution which has passed through the compartments $C_1$ and $C_2$ to be recycled through the compartments $I_1$ and $I_2$. So that the pipe-lines 14 and 17 can be connected either directly to the pickling vat or to the compartments $I_1$ and $I_2$, valves 23 and 25 are provided on the pipeline 18 and valves 22 and 24 are provided on the pipe-lines 20 and 21.

In the embodiment of FIG. 2, the input of spent pickling solution to the compartments $C_1$ and $C_2$ is effected at the bottom of each compartment via the respective pipe-lines 26 and 27, in the direction indicated by the arrows $F_3$. The regenerated solution is removed from the compartments $I_1$ and $I_2$, in the direction of the arrows $F_4$, through pipe-lines 28 and 29, which (as shown) may be joined together before discharging back into the pickling vat (not shown). Since both the input pipe-lines 26 and 27 as well as the return pipe-lines 28 and 29 communicate with the vat for the pickling solution (not shown) it is necessary for some means (not shown) to be provided for driving the solution in the desired direction. A suitable arrangement would for example be a volumetric pump for transferring the spent pickling solution from the pickling vat to the treatment installation, the return of the regenerated solution being then effected by gravity; but of course the reverse arrangement would equally be possible.

As the spent solution is introduced at the bottom of compartments $C_1$ and $C_2$, the regenerated solution is drawn off from the bottom of compartments $I_1$ and $I_2$. Transfer of partially-regenerated solution from respectively the compartment $C_1$ to the compartment $I_1$ and from the compartment $C_2$ to the compartment $I_2$ is effected via the connecting pipes $P_1$ and $P_2$ respectively, which function either as siphons or if desired may be provided with pumps in each case.

The transfer of partially-regenerated pickling solution from the cathodic compartments to the intermediate compartments should be controlled so as to ensure that the concentration in iron ions in the intermediate compartments does not exceed a threshold value which will have been decided in advance, dependent upon the degree of regeneration which is acceptable.

It will be appreciated that the rate at which partially-regenerated solution can be transferred from the cathodic compartments $C_1$ and $C_2$ to the intermediate compartments $I_1$ and $I_2$ governs the rate at which spent pickling solution can be admitted to those cathodic compartments.

For guidance, we have found that it is generally best if the concentration of $FeCl_2$ in the compartments $I_1$ and $I_2$ is maintained at less than 2 moles $FeCl_2$ for a total concentration of 5M chlorides. Since the intensity of the current traversing the cell depends upon the total concentration of $Cl^-$ ions as well as upon the $H^+/Fe^{2+}$ ratio, in order to monitor variations in the concentration of iron chlorides in the compartments $I_1$ and $I_2$ it is usually sufficient to monitor changes in the above-mentioned current intensity by putting an ammeter in series with the electrolysis circuit.

The anodic compartment of the installation of this invention is advantageously protected from any contamination by splashing or the like (which for instance is especially likely to originate from the other compartments) by means of a cover 30. Furthermore, the anodic compartment is also desirably fitted with means for gaseous purging of the anolyte, for example a pipe 31 fitted with a perforated extension 32 through which a gas, such as air, can be introduced under a slight excess pressure into the anolyte, as well as an outlet conduit 33 connected to a pump (not shown) by means of which the gas which bubbles off (which contains mainly chlorine and oxygen) can be blown into the pickling vat, where it has the advantage of increasing the oxidation-reduction potential of the pickling solution. A pipe 34 is also provided through which it is possible to replenish the anodic compartment with water.

The electrodes are connected via appropriate circuitry to the terminals of an electric power source supplying direct current at a voltage capable of transformation to provide a sufficient potential difference, which will in any case be greater than 1.7 volts.

Under these conditions, the electro-chemical reactions which are caused to take place in the various compartments (bearing in mind that the aim of the invention is to treat a spent pickling solution, contaminated with iron chlorides, so as to deplete it in iron and enrich it in hydrochloric acid) are as follows:

It is within the cathodic compartments, into which the spent solution to be treated is introduced, that this solution is freed from part of the iron which it contains. In these cathodic compartments, under the influence of the electrical field created by the electrodes and of the electrolytic current, the following succession of reactions is caused to take place:

$$H^+ + e \rightarrow \tfrac{1}{2}H_2 \uparrow$$

which is manifested by a progressive increase in the pH value; and, when the pH reaches 2:

$$Fe^{2+} + 2e^- \rightarrow Fe$$

the ratio $$\frac{H^+ \text{ discharged}}{Fe^{2+} \text{ discharged}}$$

being much greater than 1, so long as the pH is less than 2 in this compartment.

Consequently what takes place is first a release of hydrogen then followed by electrolytic deposition of iron upon the cathode.

In the anodic compartment, which as anolyte contains for example 2M sulphuric acid, what is brought about is the oxidation of the water, for which the equation reads:

$$H_2O \rightarrow \tfrac{1}{2}O_2 \uparrow + 2H^+ + 2e$$

Under the previously stated conditions:
- the H+ ions produced in the anodic compartment migrate in the direction of the cathodes, passing through the cation-selective membranes separating the anodic compartment from the intermediate compartments, but being retained in the latter since they cannot pass through the anion-selective membrane separating the intermediate compartments from the cathodic compartments; and
- the Cl- ions present in the cathodic compartments migrate towards the anode, thus passing through the anion-selective membrane into the intermediate compartments, where however they are retained since they cannot pass through the cation-selective membranes which separate the intermediate compartments from the anodic compartment.

Thus the overall outcome is as follows. In the cathodic compartments, there is a release of hydrogen followed by electro-deposition of iron on the cathode, and also a depletion in chlorine ions, which pass into the intermediate compartments. In the anodic compartment, there is oxidation of the water, that is to say a release of oxygen and a migration of H+ ions which pass over into the intermediate compartments; as a result, this anodic compartment must be resupplied as necessary with water. In the intermediate compartment, the Cl- and H+ ions originating respectively from the cathodic and anodic compartments meet to form HCl. In other words, what is achieved is depletion in iron within compartments $C_1$ and $C_2$, and enrichment in HCl within compartments $I_1$ and $I_2$.

The final product of the whole operation is thus firstly a regenerated pickling solution, replenished in HCl and depleted in iron as compared with the spent solution to an extent which is adjustable; and secondly the operation yields electrolytic iron, as well as both hydrogen and oxygen, which are by-products having some commercial value. In particular, the electrolytic iron thus recovered can have interesting and industrially-useful properties, especially as a catalyst, due to its physical-chemical texture.

In another aspect, this invention indeed extends not only to the main product of the processes herein described, namely the regenerated pickling solutions, but also to the by-products thereof, namely the abovementioned electrolytic iron and the generated gases which may be recovered.

The process of this invention is preferably operated as a continuous rather than a batch procedure, and thus with a steady circulation of the solution through the installation. Generally, however, there must be a starting phase during which no circulation of the solution under treatment can take place, since first the solution within the cathodic compartment must attain a pH sufficiently low for the deposition of iron. Such a starting phase can however be avoided if the process is modified by running in the electrodialysis cell before starting the process proper by filling the cathodic compartment with a solution of ferrous chloride, either prepared specially for this purpose or recovered as crystallization products from an abandoned bath, and then bringing this ferrous chloride solution to pH = 2, for example by adding either the unspent pickling solution or fresh HCl thereto — if that be done, the normal starting phase can be omitted and instead circulation of the solution can commence immediately, with spent pickling solution being admitted from the outset.

Experience has shown that various parameters of the process can and should be adjusted to control certain parasitic phenomena associated with the process, namely:
- decomposition of the water contained in the membrane; and
- diffusion of the ions through the membranes.

So far as concerns the decomposition of the water contained in the membranes, this is a phenomenon which is not troublesome with the cation-selective membranes (the migration of H+ ions through these membranes into the intermediate compartments being unaffected) but it is a problem which can greatly disturb the migration of the chloride ions through the anion-selective membranes. It can however be avoided by maintaining the current density at the membranes below a limiting value, which is determined when the permselectivity of the membranes is no longer close to unity, that is to say when for instance the value of the permselectivity is of the order of 85%. The moment when this limiting value is reached is recorded with the aid of an ammeter; and as soon as the phenomenon is observed, the voltage at the terminals is reduced by a suitable amount.

So far as concerns the diffusion of other ions through the membranes, this is induced by a chemical potential gradient which is established when, in the course of time the intermediate compartments become enriched in HCl. This phenomenon bodes ill for the long continuance of the concentration by electrodialysis, because if it is in fact kept to a minimum for the chloride ions, it becomes more and more troublesome for the hydrogen ions which then pass through the anionic membrane by diffusion, and their migration diminishes the part played by the chloride ions in the passage of the current through the membranes when the ratio of the acid concentration between the compartments $C_1$ and $I_1$ on the one hand, and between $C_2$ and $I_2$ on the other hand, becomes too small.

To combat this phenomenon it is however possible to increase the relative supply input to the cathodic compartment.

In order still further to illustrate the invention, a detailed numerical Example, relating to one particular installation and to a specific method of carrying out of the process therein, will now be given hereinbelow.

EXAMPLE

The installation employed was that shown in FIG. 1 save firstly that pipe-lines 4 and 7 were omitted (spent pickling solution being introduced into compartments $C_1$ and $C_2$ through the connections 10 and 11) and save secondly that there were no recycling pipe-lines 20 and 21. Accordingly the electrodialysis cell contains five compartments of the kind shown in FIG. 1 within a tank formed of polyvinyl chloride, the dimensions of these compartments being as follows:

$C_1$ and $C_2$: 50 cm × 40 cm × 10 cm = 2 × 10$^4$ ccs.
= 20 liters.

Thus their combined volume = 2 × 20 l = 40 liters.

$I_1$ and $I_2$: 50 cm × 40 cm × 5 cm = 1 × 10$^4$ ccs. = 10 liters.

Thus their combined volume = 2 × 10 l = 20 liters.

A: 50 cm × 40 cm × 10 cm = 20 liters.

The total internal volume of the electrodialysis cell is therefore 80 liters.

Air under a pressure of 200 g/cm² is bubbled through the anolyte; and the compartment A is covered over by a hood made of polyvinyl chloride.

The cathodes are formed of expanded steel sheet with a surface area of 2,000 square cms., the dimensions being 50 cm. × 40 cm × 0.1 cm.

The cathodic surface is thus: 20 dm² × 4 = 80 dm²

The anode is formed of expanded lead, and has a surface of 2,000 square cms., the dimensions being 50 cm. × 40 cm × 0.2 cm.

The anodic surface is thus: 20 dm² × 2 = 40 dm².

The exchanger membranes employed are those marketed by Ionics Inc. under the trade-name NEPTON.

The anion-selective membranes have a surface area of 50 cm × 40 cm = 2,000 square cms.

and thus the combined surface area of both such membranes is 40 dm². These anion-selective membranes are of the quaternary ammonium type; they are homogeneous and framed; their transport number for the chloride ion is 0.90; and their electrical resistance is close to 11 Ω/cm² in a 0.1 M NaCl medium.

The cation-selective membranes have the same dimensions as the anion-selective membranes discussed above, but they are of the sulphonic type; they are homogeneous and framed; their transport number for the H$^+$ ion is 0.92; and their electrical resistance in the 0.1 M NaCl medium is greater than 11 Ω/cm².

The tank is cooled by a stream of water so as to ensure that the temperature of the solutions within the different compartments is held steady at a temperature around 38° C.

Compartment A was filled with 20 liters of $H_2SO_4$ having a concentration of 200 g/l. The volume of spent pickling solution to be regenerated was 150 liters, and it had the following composition:

Chloride: 6 equivalents/liter.
Free H$^+$: 2 equivalents/liter.
Iron: 112 grams/liter.

The flow of liquid, between the compartments $C_1$ and $I_1$ on the one hand and between the compartments $C_2$ and $I_2$ on the other hand, takes place as can be seen from FIG. 1 via syphon-type pipe-lines 10 and 11 fitted with adjustable valves 12 and 13. The rate of flow between the compartments is controlled at 0.0915 per hour and per dm² of membrane surface.

The rate of input of the spent pickling solution to be regenerated into the intermediate compartments is controlled at 20 liters per hour; and bearing in mind the total membrane surface of 40 dm², it follows that 1.830 liters are derived per hour by each of the cathodic compartments. Thus the whole of the pickling solution can be expected to have passed through the cathodic compartment in a little less than 48 hours.

Throughout the course of the experiment the current densities were as follows:
at the anode: 10 A/dm²
at the cathode: 5 A/dm²
at the anion-selective membrane: 10 A/dm²
at the cation-selective membrane: 10 A/dm²

The other electric conditions were as follows:
Total current intensity through the cell: 400 A
Voltage at the terminals: 10 V.

The composition of the regenerated solution was as follows:
Chloride: 6 equivalent/liter
Free H$^+$: 4 equivalent/liter
Iron: 56 grams/liter.

The total measured consumption of electricity needed to arrive at this result was, per liter of bath, 109.5 Ah. Now, in theory the requirement per liter of bath should be:
2 Faradays for the free acidity (transfer); and
2 Faradays to regenerate the spent acid (removal of iron);

that is to say a total of 4 Faradays or 107.2 Ah. Comparing these the theoretical and actual consumptions, the efficiency of the treatment appears to be around 98%.

Knowing that over a period of time $t$ the consumption of electricity is:

$$t = 109.5/400 = 0.274 \text{ hour/liter of bath}$$

the specific treatment time $t_s$ (that is to say, the time necessary for treatment of one liter of bath per 1 dm² of membrane surface) is:

$t_s = 11$ hours/liter/dm².

Consequently, the energy requirement is:

$$W = V.I.t. = 10 \times 10 \times 11 = 1.1 \text{ kWh/l of regenerated bath,}$$

that is to say:

W = 0.275 kWh/mole of regenerated acid.

From what has been said above it will be seen that the process and the installation both provided in accordance with this invention are very suitable for the regeneration of spent pickling solutions based upon hydrochloric acid which have been used upon ferriferous surfaces and are thus contaminated with iron chlorides. Indeed, it can be seen that the processes and installations of the invention, with their variants as hereinbefore described and other modifications which will be apparent to the expert, provide a very advantageous solution to certain problems arising in the galvanizing industry, especially as regards the costs resulting from exhaustion of the pickling solutions and also as regards the difficulties encountered by manufacturers because of the pollutant nature of these solutions.

We claim:

1. A process for the regeneration of spent pickling solutions based upon hydrochloric acid, after use upon ferriferous surfaces and therefore containing iron chlorides, using an electrodialysis cell defining an anodic compartment as well as at least one intermediate compartment adjacent said anodic compartment and a cathodic compartment adjacent each intermediate compartment, each said cathodic compartment having a cathode therein and being separated by an anion-selective membrane from the adjacent intermediate compartment, the anodic compartment having an anode therein and being separated by a cation-selective membrane from each adjacent intermediate compartment, electric circuitry being provided for connecting said anode and each said cathode to a source of direct electric current, comprising the steps of introducing within the anodic compartment of said cell an anolyte with characteristics such that the overall faradaic yield for oxidation of water is about 1, whereby substantially all the electric current at the anode is used for the oxidation of water; introducing a first and a second portion of the spent pickling solution respectively and simultaneously into the cathodic compartment and into the intermediate compartment of said cell; and subjecting the first and second portions to an electrolytic treatment so as to deplete the first portion within the cathodic compartment with respect to iron by electrodeposition thereof upon the cathode and so as to enrich the second portion within the intermediate compartment with respect to hydrogen chloride by migration of chloride ions from the first portion through the anion-selective membrane to the second portion, the chloride ions originating in the cathodic compartment as a result of the removal of iron from the first portion by the electrodeposition of iron upon the cathode, and by migration of hydrogen ions from the anolyte through the cation-selective membrane to the second portion, the hydrogen ions originating from the oxidation of water in the anodic compartment, said electrolytic treatment being conducted in such a manner as to establish and maintain (i) a cathodic current density of from 0.1 to 20 $A/dm^2$, (ii) an anodic current density corresponding to the water-oxidation reaction, and (iii) a current density at the membranes such that their perm-selectivity is about 1, the arrangement being such that at any time the ionic strength in equivalents of the regenerated solution is equal to the ionic strength in equivalents of the untreated spent pickling solution.

2. A process according to claim 1, in which the cathodic current density is established and maintained at a value of from 5 to 12 $A/dm^2$.

3. A process according to claim 1, in which spent pickling solution is introduced into the cathodic and intermediate compartments in parallel, the proportion of the spent pickling solution introduced into the cathodic compartment being dependent upon the treatment capacity of the cathodic compartment.

4. A process according to claim 1, in which the spent pickling solution is introduced into the cathodic and intermediate compartments in parallel, and the solution emergent from the cathodic compartment is recycled through the intermediate compartment.

5. A process according to claim 1, in which the spent pickling solution is introduced into the cathodic and intermediate compartments in series, the solution under treatment passing successively through said compartments.

* * * * *